(Model.)                      3 Sheets—Sheet 1.

O. F. GOOD.
BICYCLE GEARING.

No. 541,270.                Patented June 18, 1895.

WITNESSES:
L. C. Leoty.
D. J. Smith Jr.

INVENTOR
Oliver F. Good.
BY
Toulmin & McCarty
his ATTORNEYS

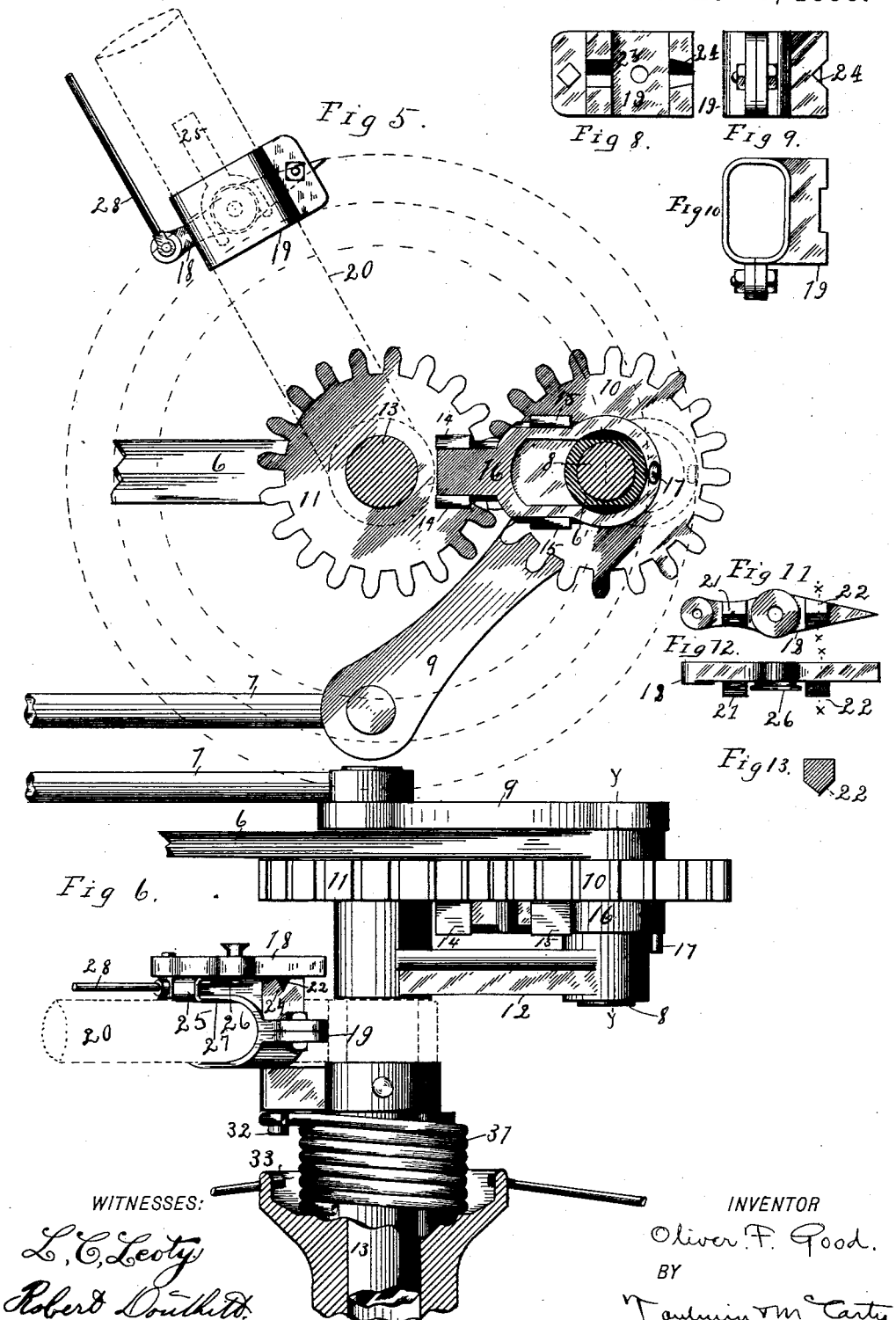

(Model.)
3 Sheets—Sheet 3.
O. F. GOOD.
BICYCLE GEARING.
No. 541,270.
Patented June 18, 1895.
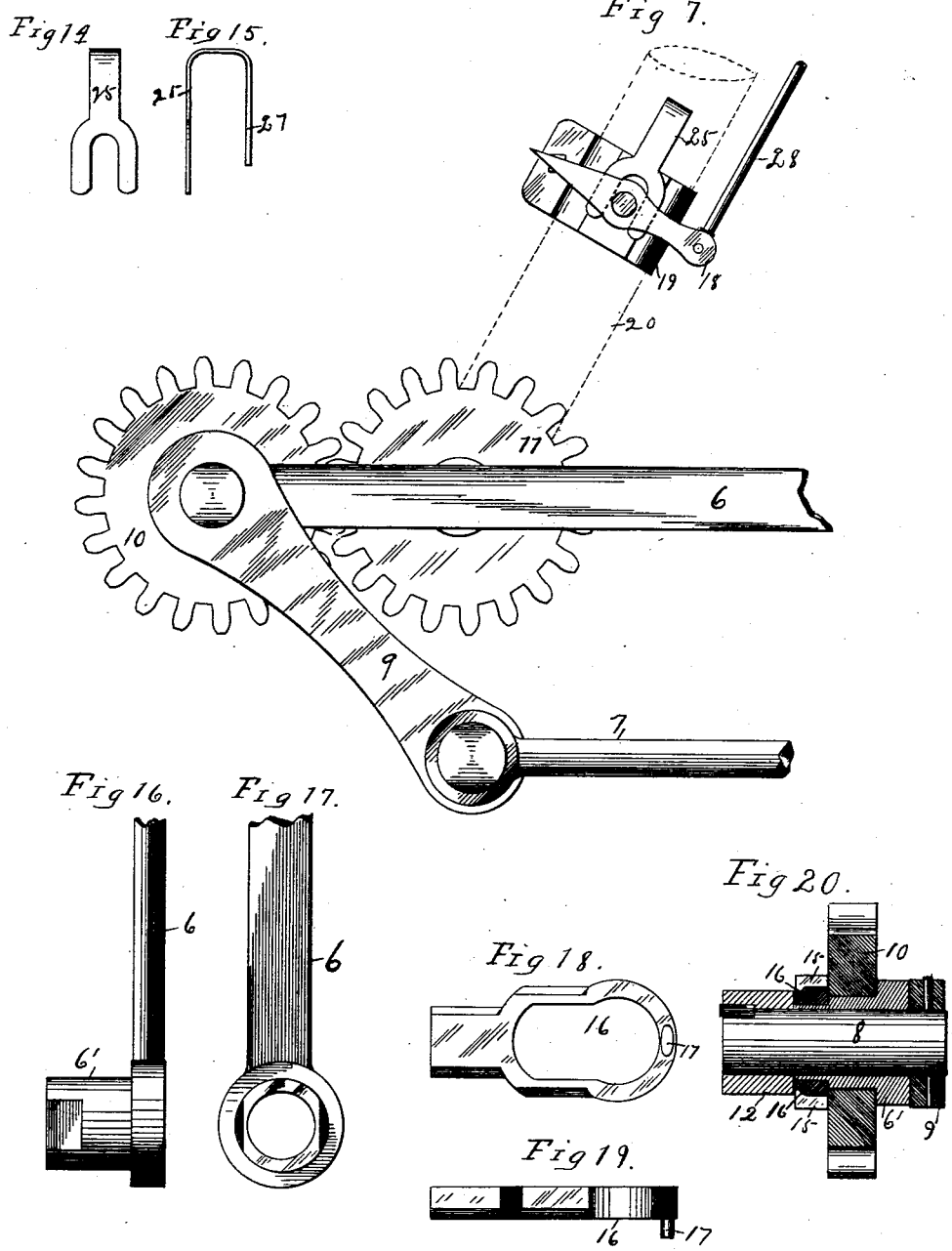
WITNESSES:
INVENTOR.
Oliver F. Good.
BY
his ATTORNEYS

UNITED STATES PATENT OFFICE.

OLIVER F. GOOD, OF DAYTON, OHIO.

BICYCLE-GEARING.

SPECIFICATION forming part of Letters Patent No. 541,270, dated June 18, 1895.

Application filed March 3, 1893. Serial No. 464,624. (Model.)

*To all whom it may concern:*

Be it known that I, OLIVER F. GOOD, a citizen of the United States, residing at Dayton, in the county of Montgomery and State of Ohio, have invented certain new and useful Improvements in Bicycle-Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in bicycle gearing.

The object of my invention is to improve the gear of a bicycle and to provide means for changing the gearing at any moment, while the bicycle is in motion. To this end I provide mechanism through the agency of which, the gear may be changed and power gained at the same time, over the chain and sprocket wheel.

Figure 1:
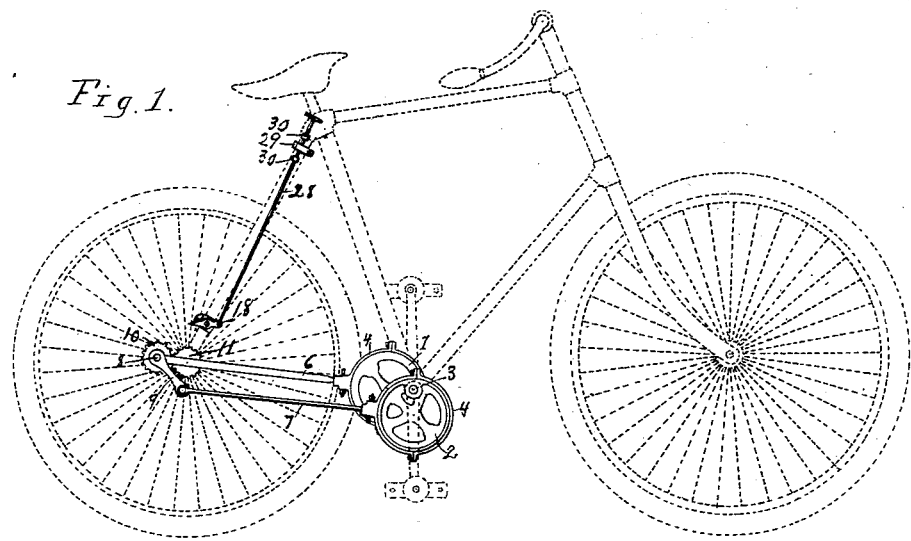
Figure 4:
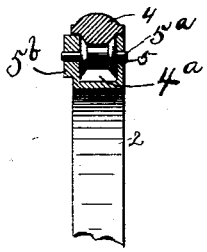
Figure 2:
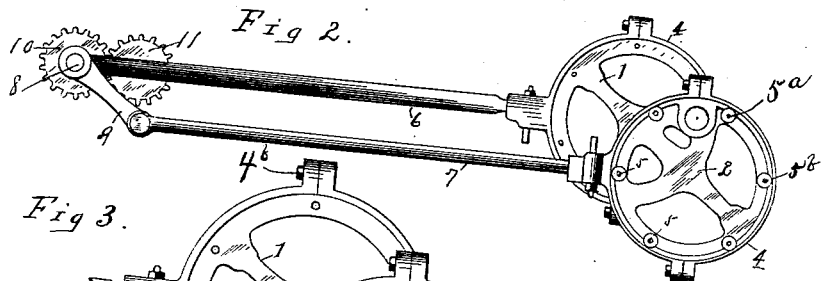
Figure 3:
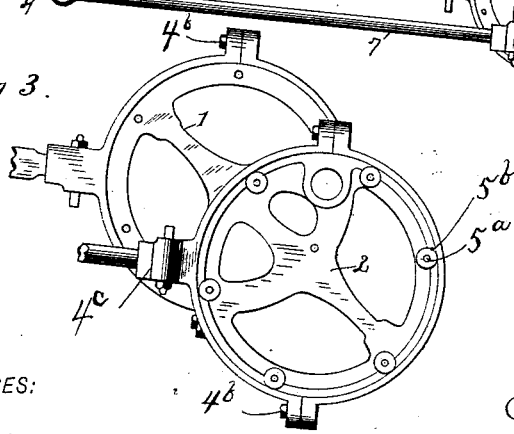

In the drawings hereto annexed and forming part of th specification, Figure 1 is a side elevation of a bicycle in dotted lines, showing my attachment in full lines; Fig. 2, a detached detail view of the eccentric and sun and planet wheels with connecting-rods; Fig. 3, a detached detail view of the eccentric wheels, the connecting-rods broken off; Fig. 4, a sectional view showing the antifriction bearing for the eccentric-wheel straps; Fig. 5, an enlarged elevation of the inner side of the gears, showing the shafts and sleeve in section and the clutch for disconnecting the gears from rigid attachment with each other. A part of the bicycle-frame is shown in dotted lines, upon which the dog for operating the gear clutch is placed. Fig. 6 is a plan view showing the location of the mechanism embodying my invention, with the addition of the spring-clutch for relieving the gearing. Fig. 7 is an enlarged front elevation of the gears detached from the bicycle, with the connecting-rods broken off. Fig. 8 is a detached detail side elevation of the dog-supporting clamp. Fig. 9 is an end elevation of the same. Fig. 10 is a plan view thereof. Fig. 11 is a detached detail plan view of the dog. Fig. 12 is a longitudinal elevation of the same; Fig. 13, a cross-section of the dog on the line X X of Figs. 11 and 12; Fig. 14, a detached detail front elevation of the bifurcated spring for maintaining the dog in the recesses of the clamp; Fig. 15, a side elevation of the same; Fig. 16, a detached detail view of the connecting-rod having the integral sleeve upon which the planet-wheel has a bearing; Fig. 17, a side view of the same; Fig. 18, a detached detail side view of the gear-clutch; Fig. 19, an edge view of the same; Fig. 20, a cross-section of the planet-gear on the line $y\ y$ of Fig. 6, with the clutch occupying the position shown in dotted lines in Fig. 5.

The same refererence characters will be found to denote corresponding parts throughout the different views.

The numerals 1 and 2 designate, respectively, eccentric wheels which are cast integrally, and occupy the relative positions shown in Figs. 2 and 3. These eccentrics are rigidly mounted on the crank shaft 3, and the peripheries thereof are each provided with a circumferential channel $4^a$ in which a suitable number of anti-friction bearing rollers 5, are placed. The journal pins $5^a$ of these rollers are journaled in a series of bearing bosses $5^b$ on the outer face, and in openings in the inner face of said eccentrics, as shown in Figs. 2, 3 and 4.

4—4 designate straps which inclose the peripheries of said eccentrics, and are securely maintained in said position by bolts $4^b$. It will therefore be seen, these straps have a bearing on said anti-friction rollers, and are each provided with socket projections $4^c$ in which ends of connecting rods 6 and 7 are inserted and made fast. The former rod —6— has upon it, an integral sleeve 6′ in which a shaft 8 is journaled. This shaft is rigidly attached to an arm 9 with which rod 7 has also a pivotal connection.

10 designates a spur gear or planetary wheel mounted on the sleeve 6′ and intermeshing with a similar spur gear or sun wheel 11 rigidly mounted on the spindle 13. This planetary wheel is held in a geared position to rotate in a fixed orbit around the sun wheel, by an arm 12 which is loosely mounted on the spindle 13, and rigidly on the shaft 8.

As the gearing appears from the description thus far given, the machine is supposed to be geared high and the wheels are not fixed to each other by the sliding clutch 16 which will be hereinafter fully described. The sun wheel 11 will complete two revolutions while the planet is making one revolution around the sun wheel.

When the eccentric wheels 1 and 2 are given a rotary motion by the driving crank through the rods 6 and 7, this accelerates the motion of the driving wheel to a greater speed of revolution than the driving crank and thereby a greater speed is attained without an extra amount of power, as compared to the chain and sprocket wheel.

The above description shows the gears as being geared up to a high rate of speed, as before stated. I provide means, however for changing this speed in an instant by the following mechanism: Upon the sun and planet wheels 10 and 11 are provided ways 14—14 and 15—15 in which a sliding clutch 16 is dove-tailed and adapted to slide. This clutch has a bearing capacity upon the sleeve 6' by means of a slot through its widest diameter, and a lug 17 on its outer extremity is placed by the partial means of which the said clutch is operated to release the planet wheel from a fixed attachment with the sun wheel which attachment is shown in Fig. 5, when the gears are connected in this manner by the clutch. The motion imparted by the rods 6 and 7 to the spindle is similar to that of a crank, and the capacity for speed is reduced. To increase the capacity for speed, the clutch is removed from its actual position, to that shown in dotted lines in the same figure, (Fig. 5.) This is accomplished by providing a dog 18 pivoted to a clamp 19 which is secured to the rear post 20 of the bicycle. This dog is constructed with V-shaped portions as at 21 and 22 which are provided with similar recesses 23 and 24 in the side of the clamp 19, which recesses are occupied, normally by the dog, by means of a bifurcated spring 25 straddling the lug 26 on the dog. This spring is secured in position by the part 27 thereof being secured between the clamp 19 and the rear post 20 as shown in Fig. 6, and holds the dog in the V-shaped grooves. A rod 28 is attached to one end of the dog, extends upward adjacent to the rear post of the machine and is operatively secured thereto by means of a staple or clamp 29 attached to said post. The upper end of the rod is provided with a handle that may be grasped by the rider to throw the dog in a position to engage the lug 17 on the clutch 16. The movement of the rod 28 is limited in either direction by stops 30—30.

From the above mention of the sliding clutch 16, it will be understood that its object is two-fold, to-wit: it holds the sun and planet wheels in a fixed position so that they cannot revolve independently of each other, as is shown in Fig. 5. The other object is to secure the planet wheel to the sleeve of rod 6, which is the case when said clutch is slid away from the sun wheel as shown in dotted lines in Fig. 5, thereby presenting two given points on the planet wheel at all times in a horizontal position.

The operation of the dog and clutch is as follows: As the planet wheel is rotated in the path shown in dotted lines, Fig. 5, by the driving crank through the medium of the eccentric wheel and connecting rods, the dog may be turned upon its pivot by drawing upon the rod 28. This causes said dog to slide laterally out of the V-shaped recesses in the clamp, lowers the point of the dog at the same time to a plane just below the path of the lug 17 of the clutch as the latter is being carried around at which point the dog engages with lower surface of said lug whereby the clutch is slid entirely away from the ways 14—14 on the sun wheel, and entirely onto the planet wheel at which time, the said planet wheel rotates around the sun wheel causing the driving wheel to assume a speed greater than that of the driving crank.

To relieve the gearing from rotary motion when the bicycle is being propelled by other power than that applied to the driving cranks, I employ a spring clutch 31, one end of which is attached to a lug 32 projecting from a collar secured to spindle 13. This spring spirally surrounds the hub 33. When a rotary motion is imparted to the hub by the crank shaft 3 the action of the spindle is to contract the spring closely around the hub. When the spring is so wound or contracted, the hub becomes tightened thereby to the spindle and these parts rotate together. In descending an incline, power is removed from the driving crank. The expansion of the spring clutch allows the hub 33 to turn independently of the spindle.

My improvements are provided with ball bearings throughout or other suitable antifriction bearings, which have not appeared in the drawings for the reason that such bearings are of well known construction.

In the drawings I have shown the crank-actuated eccentric wheels as the most suitable for conveying rotary motion to the sun wheel, but the application of this means may be substituted by other means to effect the same results without departing from the spirit of my invention.

Having fully described my invention, I claim as new and desire to secure by Letters Patent—

1. In a bicycle gearing, the combination of the frame, the spindle and driving wheel having bearings therein, the sun wheel fixed on the spindle, a planet wheel loosely secured to said spindle by an arm and meshing with the sun wheel, eccentric wheels fixed to the driving crank, the rods 6 and 7 connected with the eccentric wheels, the former rod also connected with the planet wheel, and the arm 9 intervening between said planet wheel and the rod 7, substantially as described.

2. In a bicycle gearing, the combination with the driving spindle; of a sun wheel rigidly mounted on said spindle; a planetary wheel held in gear with said sun wheel by an arm 12; eccentric wheels fixed to the driving crank; rods 6 and 7, the former rod having a sleeve 6' upon which the planetary wheel is loosely mounted, and both of said rods having a fixed connection with said eccentric wheels; an arm 9 connecting rod 7 with the planetary wheel, and means for interlocking said planetary wheel with the sun wheel, or with the sleeve 6', substantially as described.

3. In a bicycle gearing, the combination with the driving spindle; of sun and planet wheels adapted to actuate said spindle; eccentric wheels fixed to the driving crank; rods 6 and 7 fixed to said eccentric wheels, said rod 6 provided with a sleeve 6' upon which said planet wheel is loosely mounted; an arm 9 connected to rod 7, and to a shaft 8; a sliding clutch adapted to interlock said sun and planet wheels, or to interlock said planet wheel with the sleeve 6'; a lug on said sliding clutch; a dog pivoted to the rear fork of the bicycle; a rod connected to said dog, by means of which said dog may be actuated to engage with the lug on said clutch to release said clutch from engagement with the sun wheel, and to permit it to engage with the sleeve 6', substantially as described.

4. In a bicycle gearing, the combination of the sun and planet wheels with the ways 14—14 and 15—15, of a sliding clutch provided with a lug on one end thereof, of a clamp fixed to the rear fork of the machine, having a recessed portion, a dog pivoted to said clamp and having a normal seat in the recessed portion thereof by the action of the bifurcated spring, substantially as herein described.

5. In a bicycle gearing, the combination with the sun and planet wheels, of eccentric wheels fixed to the driving crank, circumferential straps on the periphery of said eccentric wheels, with anti-friction bearings there-between, the rods 6 and 7, and the arm 9 by means of which a connection of the eccentric and the planet wheels is effected, whereby motion from the former is transmitted to the latter, substantially as herein described.

6. In a bicycle gearing, the combination with the sun and planet wheels provided with ways 14—14 and 15—15, the eccentric wheels and connections between them and the planet wheel as herein described; of the sliding clutch 16, by means of which the planet wheel will become fixed when released from the sun wheel, the dog 18 with V-shaped offsets, and the clamp 19 therefor with V-shaped recesses, the spring 25 to maintain the dog in a normal position, the rod 28 to actuate the dog from a normal position, substantially as herein described.

In testimony whereof I affix my signature in presence of two witnesses.

OLIVER F. GOOD.

Witnesses:
GEORGE H. WOOD.
R. JAY MCCARTY.